(12) United States Patent
Carson et al.

(10) Patent No.: US 8,745,044 B2
(45) Date of Patent: Jun. 3, 2014

(54) GENERATING DESCRIPTIONS OF MATCHING RESOURCES BASED ON THE KIND, QUALITY, AND RELEVANCE OF AVAILABLE SOURCES OF INFORMATION ABOUT THE MATCHING RESOURCES

(75) Inventors: Chad Carson, Redwood City, CA (US); Mohan V. Nibhanupudi, San Jose, CA (US); Robert Meyers, Castro Valley, CA (US); Dmitri Pavlovski, San Francisco, CA (US); Douglas Cook, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1120 days.

(21) Appl. No.: 12/172,165

(22) Filed: Jul. 11, 2008

(65) Prior Publication Data

US 2008/0270394 A1     Oct. 30, 2008

Related U.S. Application Data

(62) Division of application No. 10/365,273, filed on Feb. 11, 2003, now Pat. No. 7,406,458.

(60) Provisional application No. 60/411,533, filed on Sep. 17, 2002.

(51) Int. Cl.
*G06F 17/30* (2006.01)

(52) U.S. Cl.
USPC ............................. 707/728; 707/694; 707/769

(58) Field of Classification Search
USPC ............................ 707/708, 711, 694, 728, 769
See application file for complete search history.

(56) References Cited

U.S. PATENT DOCUMENTS

| | | | |
|---|---|---|---|
| 5,715,453 A | 2/1998 | Stewart | |
| 5,778,397 A | 7/1998 | Kupiec et al. | |
| 5,913,215 A * | 6/1999 | Rubinstein et al. | 707/708 |
| 6,092,074 A | 7/2000 | Rodkin et al. | |
| 6,334,132 B1 | 12/2001 | Weeks | |

(Continued)

FOREIGN PATENT DOCUMENTS

WO      WO 0219172 A1    3/2002

OTHER PUBLICATIONS

Glossbrenner et al. "Search Engines for the World Wide Web", Chapter 6, 3rd Edition, Peachpit Press, 2001.

(Continued)

*Primary Examiner* — Robert Beausoliel, Jr.
*Assistant Examiner* — Alexandria Bromell
(74) *Attorney, Agent, or Firm* — Hickman Palermo Truong Becker Bingham Wong LLP

(57) ABSTRACT

Techniques are provided for generating descriptions of matching resources in a manner that takes into account the kind, quality, and relevance of the available sources of information about the matching resources. For example, after the search engine identifies matching resources based on the query terms, the search engine determines the kinds of available sources of information about each matching resource. For each matching resource, based on the kinds of available sources of information about the matching resource, one of a plurality of processes is selected to generate a description for the matching resource. Using the content-sensitive description generation techniques described herein, a single result set may include abstracts that were generated using several different processes, where the difference in process corresponds to a difference in the kind, quality, and relevance of the available sources of information about each matching resource.

18 Claims, 5 Drawing Sheets

---

302
BASED ON A PROPORTION OF WORDS THAT ARE CONTAINED IN BOTH A "SECOND SET" TEXT STRING AND A FIRST DATA SET RELATIVE TO WORDS THAT ARE CONTAINED IN THE "SECOND SET" TEXT STRING BUT NOT IN THE FIRST DATA SET, DETERMINE WHETHER TO REMOVE THE "SECOND SET" TEXT STRING FROM A SECOND SET OF TEXT STRINGS

↓

304
BASED ON A PROPORTION OF WORDS THAT ARE CONTAINED IN BOTH A "FIRST SET" TEXT STRING AND A SECOND DATA SET RELATIVE TO WORDS THAT ARE CONTAINED IN THE "FIRST SET" TEXT STRING BUT NOT IN THE SECOND DATA SET, DETERMINE WHETHER TO REMOVE THE "FIRST SET" TEXT STRING FROM A FIRST SET OF TEXT STRINGS

↓

306
COMBINE THE FIRST SET OF TEXT STRINGS WITH THE SECOND SET OF TEXT STRINGS

(56) References Cited

U.S. PATENT DOCUMENTS

| | | | |
|---|---|---|---|
| 6,349,316 B2* | 2/2002 | Fein et al. | 715/267 |
| 6,516,312 B1* | 2/2003 | Kraft et al. | 707/610 |
| 6,581,057 B1* | 6/2003 | Witbrock et al. | 707/722 |
| 6,694,331 B2 | 2/2004 | Lee | |
| 6,760,720 B1 | 7/2004 | De Bellis | |
| 6,766,287 B1 | 7/2004 | Kupiec et al. | |
| 6,820,237 B1* | 11/2004 | Abu-Hakima et al. | 715/210 |
| 6,836,768 B1 | 12/2004 | Hirsch | |
| 6,904,564 B1* | 6/2005 | Harris et al. | 715/209 |
| 6,999,961 B2 | 2/2006 | Hall | |
| 7,130,841 B1 | 10/2006 | Goel et al. | |
| 7,165,080 B2 | 1/2007 | Kotcheff et al. | |
| 7,177,862 B2 | 2/2007 | Zhang et al. | |
| 7,249,122 B1* | 7/2007 | Bushee et al. | 707/707 |
| 7,376,641 B2* | 5/2008 | Chang et al. | 707/708 |
| 2002/0129014 A1* | 9/2002 | Kim et al. | 707/707 |
| 2002/0138528 A1* | 9/2002 | Gong et al. | 707/530 |
| 2005/0119873 A1* | 6/2005 | Chaney et al. | 704/1 |
| 2006/0064411 A1 | 3/2006 | Gross et al. | |
| 2010/0057577 A1 | 3/2010 | Stefik et al. | |
| 2010/0070448 A1 | 3/2010 | Omoigui | |
| 2010/0205199 A1 | 8/2010 | Lin et al. | |
| 2010/0305942 A1* | 12/2010 | Chaney et al. | 704/9 |
| 2010/0312724 A1 | 12/2010 | Pinckney et al. | |
| 2012/0246151 A1* | 9/2012 | Larsson et al. | 707/722 |

OTHER PUBLICATIONS

Berger, et al. OCELOT: A system for summarizing web pages, In Proceedings of the 23rd Annual International ACM SIGIR Conference on Research and Development in Information Retrieval, p. 144-151, 2000.

Adam Berger, et al., "Query-Relevant Summarization using FAQs," date unknown, 8 pages.

Vibhu Mittal, et al., "Selecting Text Spans for Document Summaries: Heuristics and Metrics," 1999, American Association of Artificial Intelligence, 7 pages.

U.S. Appl. No. 12/367,225, filed Feb. 6, 2009, Notice of Allowance, Mailing Date Apr. 14, 2011.

* cited by examiner

GENERATING DESCRIPTIONS OF MATCHING RESOURCES BASED ON THE KIND, QUALITY, AND RELEVANCE OF AVAILABLE SOURCES OF INFORMATION ABOUT THE MATCHING RESOURCES

CLAIM OF PRIORITY

This application claims benefit of priority under 35 U.S.C. §120 as a Divisional of U.S. patent application Ser. No. 10/365,273, filed Feb. 11, 2003 now U.S. Pat. No. 7,406,458, the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

U.S. patent application Ser. No. 10/365,273 claims the benefit of priority to U.S. Provisional Patent Application Ser. No. 60/411,533, titled "SMART ABSTRACTS IN WEB SEARCH," filed Sep. 17, 2002, the contents of which are incorporated by reference herein for all purposes.

FIELD OF THE INVENTION

The present invention relates to search engines, and in particular, to generating descriptions of resources based on the context in which search query terms are used within those resources.

BACKGROUND OF THE INVENTION

A search engine is a computer program that helps a user to locate information. To locate information on a particular topic, a user can submit to a search engine one or more search query terms related to the topic. In response, the search engine executes the search query and generates information about the results of the search. The information about the results of the search, referred to herein as the "search results", usually contains a list of the resources that satisfy the search query. The resources identified in the search results are referred to herein as "matching resources".

While search engines may be applied in a variety of contexts, search engines are especially useful for locating resources that are accessible through the Internet. Resources may include files whose content is composed in a page description language such as Hypertext Markup Language (HTML). Such files are typically called pages. Using a web browser, pages may be retrieved by selecting HTML links that contain the Universal Resource Locators (URLs) of the pages.

Depending on the query terms used and the number of pages that contain those query terms, search results may contain so many matching resources that a user may be overwhelmed when trying to determine which matching resources to investigate further. To assist a user in selecting one or more matching resources from a list, the search results may include a short description, or abstract, for each matching resource. By reading the abstract for a given matching resource, a user should be able to better determine whether the matching resource merits further investigation. Abstracts should be relatively short, so that a user may quickly judge the relevance of matching resources listed in the search results.

Unfortunately, abstracts that are displayed by existing search engines frequently fail to provide a user with the most useful information that is contained on a page. The search results generated by existing search engines typically include abstracts that have been generated based on the words that are contained in the matching documents, but without taking into account the kind, quality, or relevance of the various sources of information about the matching documents.

For example, if a user submits a search query for "Chinese food", some matching resources may contain information about restaurants, and some matching resources may contain information about cookbooks. A particular matching resource may be associated with multiple sources of information about that particular matching resource. For example, one matching resource that contains information about a restaurant might be associated with a database that contains a telephone number and/or an address of the restaurant, and another matching resource that contains information about a restaurant might not be associated with such a database. One matching resource that contains information about a cookbook might be associated with a database that contains a price of, and/or a number of pages in, the cookbook, and another matching resource that contains information about a cookbook might not be associated with such a database. Existing search engines usually do not account for this difference in available sources of information about matching resources. Rather, the process that existing search engines use to generate abstracts for pages about restaurants is usually the same process that existing search engines use to generate abstracts for pages about cookbooks, regardless of the differences in available sources of information about the pages. As a result, existing search engines display abstracts that often fail to capture the most useful information that is contained in the matching resources that the abstracts describe.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

Techniques are provided for generating descriptions of matching resources in a manner that takes into account the kind, quality, and relevance of the available sources of information about the matching resources. For example, after the search engine identifies matching resources based on the query terms, the search engine determines the kinds of available sources of information about each matching resource. For each matching resource, based on the kinds of available sources of information about the matching resource, one of a plurality of processes is selected to generate a description for the matching resource. Thus, one process may be selected to generate a description for one matching resource, and another process may be selected to generate a description for another matching resource. Using the content-sensitive description generation techniques described herein, a single result set may include abstracts that were generated using several different processes, where the difference in process corresponds to a difference in the kind, quality, and relevance of the available sources of information about each matching resource.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Techniques for generating descriptions of matching resources based on the kind, quality, and relevance of the available sources of information about the matching resources are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

When a search engine selects matching resources based on query terms that were submitted to the search engine, the kind, quality, and relevance of the available sources of information about some matching resources may differ from the kind, quality, and relevance of the available sources of information about other matching resources. In other words, even though all of the matching resources were selected based on the same query terms (e.g., "Chinese food"), the kind, quality, and relevance of the available sources of information about each of the matching resources may differ.

The most useful information that is contained in a page is likely to depend on the kind, quality, and relevance of the available sources of information about that page. An abstract that describes a particular page should contain as much of the most useful information that is contained in available sources of information about the page as possible while staying within a reasonable length. Therefore, given a plurality of processes that may be used to generate or select an abstract for a page in different ways, the process that is selected to generate or select an abstract for the page should be customized for the kind, quality, and relevance of the available sources of information about the page. Some such sources may be contained within the page itself, and other such sources, such as databases, may be external to the page.

Figure 1:
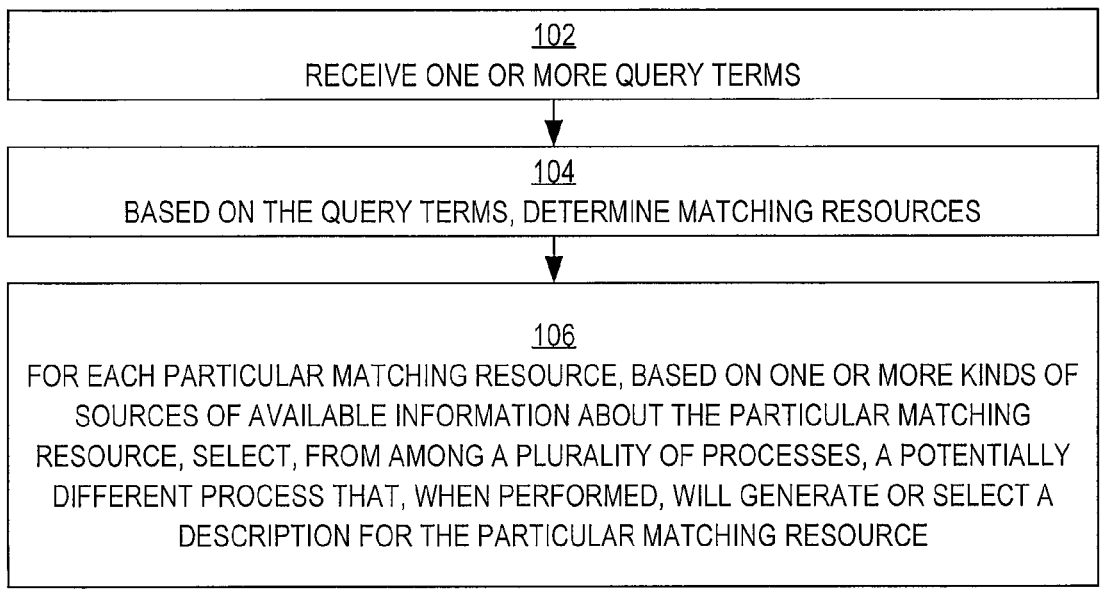
FIG. 1 is a flow diagram that illustrates a technique, according to an embodiment of the present invention, for generating descriptions of matching resources based on the kind, quality, and relevance of the available sources of information about the matching resources.

FIG. 1 is a flow diagram that illustrates a technique, according to an embodiment of the present invention, for generating descriptions of matching resources based on the kind, quality, and relevance of the available sources of information about the matching resources. In block 102, one or more query terms are received. For example, a search engine may receive the query terms "Chinese food" from a user.

In block 104, based on the query terms, matching resources are determined. For example, a search engine may search a collection of pages for pages that contain the query terms "Chinese food" and, based on the search, select several pages from among the plurality of pages.

In block 106, for each particular matching resource, based on one or more kinds of sources of available information about the particular matching resource, a process is selected, from among a plurality of processes. For each particular matching resource, the selected process, when performed, will generate or select a description, or abstract, for the particular matching resource. The process selected for one matching resource may be the same as or different than a process selected for another matching resource. For example, if a search engine determines that a particular page contains a brief description that seems to have been generated by a person, then the search engine may select, from among a plurality of processes that select or generate abstracts, a process that attempts to generate an abstract that contains that brief description. Brief descriptions generated by people are likely to contain the most useful information about a page. If such a description is unavailable, then the search engine may select a process that attempts to generate an abstract based on some other source of available information about the page. Thus, one kind of source of information is a brief description that seems, according to specified criteria, to have been generated by a person. Other kinds of sources of information may be sources that seem to have not been generated by a person. For example, other kinds of sources of information may be sources that seem, according to specified criteria, to have been generated by a computer.

Because sources of available information about matching resources may differ from matching resource to matching resource, the process selected for each matching resource may differ.

Once abstracts have been selected or generated according to the above technique for each matching resource in the search results, the abstracts may be displayed to a user that entered the query terms. Thus, a search engine may display abstracts that are more likely to capture the most useful information that is contained in or associated with the resources that the abstracts describe.

Static Abstracts and Contextual Abstracts

As is described above, different processes may be used to generate abstracts for matching resources. Among the kinds of abstracts that a particular process may generate or select are static abstracts and contextual abstracts. A static abstract is an abstract whose content is not dictated by search terms. A contextual abstract, on the other hand, is an abstract whose content is dictated, at least in part, by search terms.

In a system where the technique for generating an abstract may change on a resource-to-resource basis based on the content of the resources, a first process may be configured to generate or select a static abstract for one matching resource, and a second process may be configured to generate or select a contextual abstract for another matching resource, even if both matching resources are obtained using the same query terms. Static abstracts and contextual abstracts are described below.

Static abstracts are generated without regard to query terms entered by a user. Each page may be associated with a static abstract for that page. While a static abstract for one page typically differs from a static abstract for another page, a static abstract for a particular page typically does not change due to query terms (although any query terms that happen to occur within a static abstract may be automatically emphasized when the static abstract is presented to a user). Therefore, static abstracts may be generated in advance of a search engine's receipt of query terms. Static abstracts may be manually generated by a human author or automatically generated by a computer program.

The content of a static abstract may be obtained from one or more specified fields of a page. For example, HTML defines fields such as a title field and a meta field. Some or all of the text within these fields may be placed within a static abstract for the page that contains the fields.

The content of a static abstract may be generated according to some algorithm that extracts text from a page. For example, an algorithm may place the first N words of a page within a static abstract for that page, regardless of whether the first N words contain any query terms that might be received from a user.

Unlike static abstracts, contextual abstracts may be generated or selected based on the specific query terms that are entered by a user. Therefore, multiple contextual abstracts may be associated with a particular page, where the specific contextual abstract that is used to represent the page in the search results is based on the terms in the query for which the search results are being generated. A contextual abstract may include, among other things, phrases extracted from the portion of the matching resource that contains the query terms. Thus, a contextual abstract may describe the content of a particular page in the context of the query terms. A technique for generating a contextual abstract is provided below in the section entitled "GENERATING A CONTEXTUAL ABSTRACT".

In some cases, a contextual abstract may be more likely than a static abstract to contain the most useful information that is contained in a page. In other cases, such as when a static abstract is manually authored by a human being, a static abstract may be more likely than a contextual abstract to contain the most useful information that is contained in a page. In yet other cases, the most useful information that is contained in a page is most likely to be found in an abstract that is a composite of a static abstract and a contextual abstract for the page. A technique for generating an abstract based on a static abstract and a contextual abstract is described below.

Generating an Abstract Based on Contextual and Static Abstracts

Figure 2:
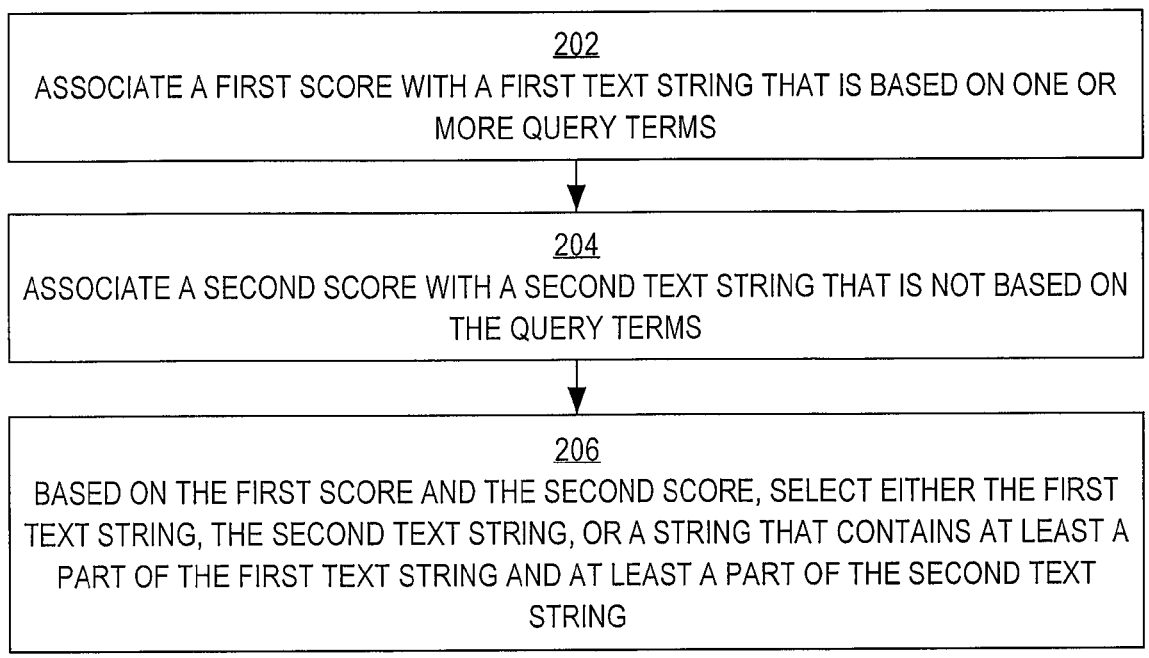
FIG. 2 is a flow diagram that illustrates a technique, according to an embodiment of the present invention, for generating an abstract based on a contextual abstract and a static abstract.

FIG. 2 is a flow diagram that illustrates a technique, according to an embodiment of the present invention, for generating an abstract based on a contextual abstract and a static abstract. In some cases, the generated abstract may consist entirely of a static abstract. In some cases, the generated abstract may consist entirely of a contextual abstract. In some cases, the generated abstract may contain parts of a static abstract and parts of a contextual abstract. The generated abstract may be referred to as a "intelligent" abstract. While two text strings are described below for sake of simple illustration, embodiments are not limited to two text strings. Some embodiments may generate an abstract based on more than two text strings and combinations thereof.

In block 202, a first score is associated with a first text string that is based on one or more query terms. For example, a search engine may associate a score with a contextual abstract for a particular page. A technique for determining a score for an abstract is described below in the section entitled "DETERMINING A SCORE FOR AN ABSTRACT".

In block 204, a second score is associated with a second text string that is not based on the query terms. For example, a search engine may associate a score with a static abstract for the particular page.

In block 206, either the first text string, the second text string, or a string that contains at least parts of the first text string and the second text string is selected based on the first score and the second score. For example, a search engine may compare a score for a static abstract with a score for a contextual abstract, and, based on the comparison, generate an abstract that consists entirely of either the static abstract or the contextual abstract, or contains parts of both the static abstract and the contextual abstract.

An abstract that contains parts of both a static abstract and a contextual abstract may be referred to as a "composite" abstract. A technique for generating a composite abstract is described below in the section entitled "COMPOSING A STATIC ABSTRACT AND A CONTEXTUAL ABSTRACT INTO A COMPOSITE ABSTRACT".

In one embodiment, the first text string is a static abstract, and the second string is a contextual abstract. In one embodiment, if the score that is associated with the static abstract is greater than a first specified threshold, and if the score that is associated with the contextual abstract is greater than a second specified threshold, then a composite abstract is selected to be the intelligent abstract.

In one embodiment, if the score that is associated with the static abstract is greater than the first specified threshold, and if the score that is associated with the contextual abstract is not greater than the second specified threshold, then the static abstract is selected to be the intelligent abstract.

In one embodiment, if the score that is associated with the static abstract is not greater than the first specified threshold, and if the score that is associated with the contextual abstract is greater than the sum of a specified number and the score that is associated with the static abstract, then the contextual abstract is selected to be the intelligent abstract.

In one embodiment, if the score that is associated with the static abstract is not greater than the first specified threshold, and if the score that is associated with the contextual abstract is not greater than the sum of the specified number and the score that is associated with the static abstract, and if the score that is associated with the contextual abstract is greater than a third specified threshold, then a composite abstract is selected to be the intelligent abstract.

In one embodiment, if the score that is associated with the static abstract is not greater than the first specified threshold, and if the score that is associated with the contextual abstract is not greater than the sum of the specified number and the score that is associated with the static abstract, and if the score that is associated with the contextual abstract is not greater than the third specified threshold, then the static abstract is selected to be the intelligent abstract.

In one embodiment, any specified thresholds or numbers described herein may be determined by examining results that are produced when such specified thresholds or numbers are set to particular values, and then by examining other results that are produced when such specified thresholds or numbers are set to different particular values. Based on the differences between the results produces given different values, optimum settings for specified thresholds and numbers may be determined.

Determining a Score for an Abstract

The score associated with a static abstract should be an indicator of the probability that the static abstract was manually, and not automatically, generated. Manually generated static abstracts often contain the most useful information that is contained in a page. Thus, in one embodiment, the criteria used to associate a score with an abstract are selected to maximize scores that are associated with manually generated abstracts. In various embodiments, one or more of the factors described below may be used, separately or in combination, to associate a score with an abstract. In one embodiment, all of the factors described below are combined to associate a score with an abstract.

The score that is associated with a static abstract may be based on whether the static abstract contains fewer than a specified number of characters. For example, a lower score may be associated with a static abstract that contains at least 200 characters, and a higher score may be associated with a static abstract that contains less than 200 characters.

The score that is associated with a static abstract may be based on whether the static abstract ends with punctuation, such as a period, question mark, or exclamation point. For example, a higher score may be associated with a static abstract that ends with a period, and a lower score may be associated with a static abstract that ends with an alphanumeric character.

The score that is associated with a static abstract may be based on the percentage of the query terms that are contained in the static abstract. For example, a higher score may be associated with a static abstract that contains 75% of the query terms, and a lower score may be associated with a static abstract that contains only 25% of the query terms.

The score that is associated with a contextual abstract may be based on the percentage of the query terms that are contained within a single excerpt of the contextual abstract. Excerpts are described below in the section entitled "GENERATING A CONTEXTUAL ABSTRACT". For example, a higher score may be associated with a contextual abstract that contains an excerpt that contains 75% of the query terms, and a lower score may be associated with a contextual abstract that contains no excerpt that contains more than 25% of the query terms.

The score that is associated with an abstract (static or contextual) may be based on how many times a query term appears in the abstract. For example, a higher score may be associated with an abstract that contains ten instances of a query term, and a lower score may be associated with an abstract that contains only one instance of a query term.

The score that is associated with an abstract (static or contextual) may be based on how many times a specified character occurs in the abstract. For example, a higher score may be associated with an abstract that contains only one instance of a slash or backslash character, and a lower score may be associated with an abstract that contains ten instances of a slash or backslash character.

The occurrence of some specified characters within an abstract may affect the score for that abstract more than the occurrence of other specified characters within an abstract. For example, the presence of "adjacency" characters in an abstract may lower a score for that abstract more than the presence of "space" characters in that abstract. Both "adjacency" and "space" characters are described below in the section entitled "MATCHING COMPOUND WORDS TO MULTIPLE WORDS."

The score that is associated with a contextual abstract may be based on the number of excerpts in the contextual abstract. For example, a higher score may be associated with a contextual abstract that contains only two excerpts, and a lower score may be associated with a contextual abstract that contains seven excerpts.

The score that is associated with an abstract (static or contextual) may be based on the proximity of the query terms that occur within the abstract. For example, a higher score may be associated with an abstract in which query terms occur in close proximity to each other, and a lower score may be associated with an abstract in which query terms occur in distant proximity to each other.

The score that is associated with an abstract (static or contextual) may be based on the percentage of characters in the abstract that are uppercase, lowercase, numeric, or other types of characters. For example, a higher score may be associated with an abstract in which the number of uppercase characters divided by the number of uppercase and lowercase characters is not greater than 0.2, and a lower score may be associated with an abstract in which the number of uppercase characters divided by the number of uppercase and lowercase characters is greater than 0.2.

The score that is associated with an abstract (static or contextual) may be based on the number of words in the query. For example, a higher score may be associated with a contextual abstract, and a lower score may be associated with a static abstract, when there are many, rather than few, words in the query. As the number of words in a query increases, the score associated with a contextual abstract may increase accordingly, and the score associated with a static abstract may decrease accordingly.

The score that is associated with an abstract (static or contextual) may be based on other factors as well, such as the number of matching resources that result from the query, and/or the distribution of the relevance scores associated with such matching resources.

Composing a Static Abstract and a Contextual Abstract into a Composite Abstract

Often, a search engine is configured to display search results in which a title of each particular matching resource is listed with an abstract of the particular matching resource. Ideally, phrases in the title of a matching resource should not be duplicated in the abstract of the matching resource.

Figure 3:
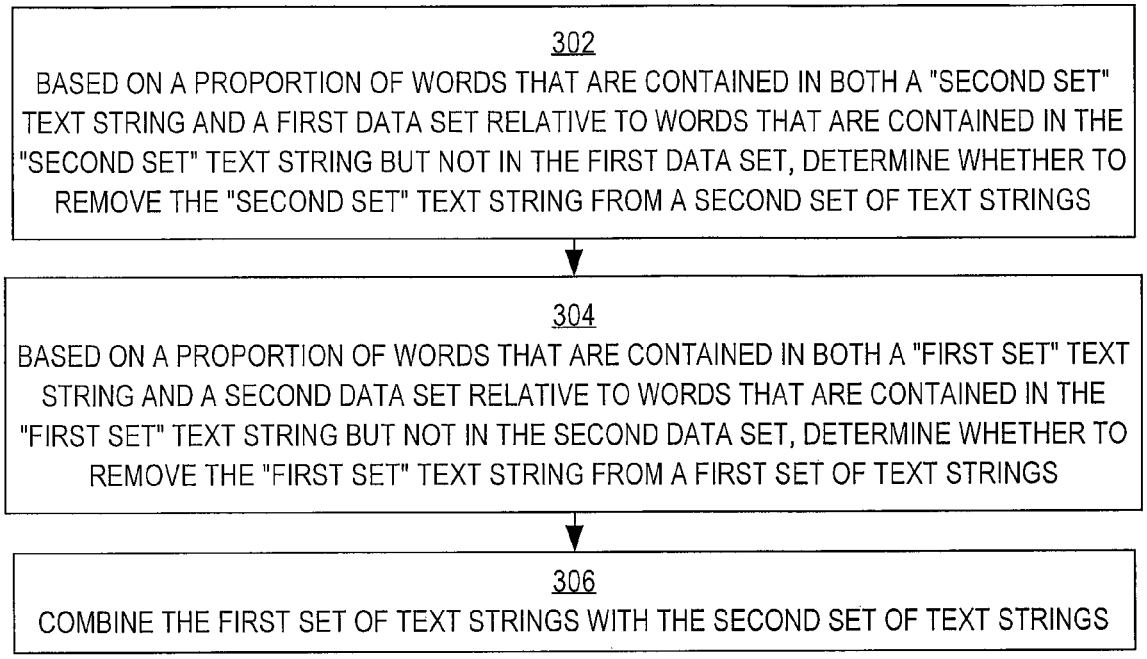
FIG. 3 is a flow diagram that illustrates a technique, according to an embodiment of the present invention, for composing a static abstract and a contextual abstract into a composite abstract.

FIG. 3 is a flow diagram that illustrates a technique, according to an embodiment of the present invention, for composing a static abstract and a contextual abstract into a composite abstract. To simplify explanation, the technique is described with reference to two data sets. A first data set contains a first set of text strings and a title. A second data set contains a second set of text strings and the same title.

For example, the first set of text strings may contain one or more "first set" text strings that are in a static abstract that is associated with a particular page. The second set of text strings may contain one or more "second set" text strings that are in a contextual abstract that is associated with the same page. In one embodiment, each "first set" text string is a separate "excerpt" of a static abstract, and each "second set" text string is a separate "excerpt" of a contextual abstract. Excerpts are described below in the section entitled "GENERATING A CONTEXTUAL ABSTRACT". The title may be the title of the same page, and may be extracted from an HTML title field that is contained in the page.

In block 302, based on a proportion of words that are contained in both a "second set" text string and the first data set relative to words that are contained in the "second set" text string but not in the first data set, it is determined whether to remove the "second set" text string from the second set of text strings. For example, for each excerpt in a contextual abstract of a page, a search engine may determine a percentage of the words in the excerpt that are also contained in either the title of the page or the static abstract of the page. If the percentage is greater than a specified threshold, then the excerpt may be removed from the contextual abstract for composition purposes. In this manner, the contextual abstract may be "pared down" to what is likely the non-redundant information contained therein before it is combined with a part of the static abstract.

In block 304, based on a proportion of words that are contained in both a "first set" text string and the second data set relative to words that are contained in the "first set" text string but not in the second data set, it is determined whether to remove the "first set" text string from the first set of text strings. For example, for each text string in a static abstract of a page, a search engine may determine a percentage of the words in the text string that are also contained in either the title of the page or the contextual abstract of the page. If the percentage is greater than a specified threshold, then the text string may be removed from the static abstract for composition purposes. In this manner, the static abstract may be "pared down" to what is likely the non-redundant information contained therein before it is combined with a part of the contextual abstract.

In one embodiment, the determination described above with reference to block 304 is not performed for each text string in a static abstract of a page. Instead, in one embodiment, it is determined whether to remove the last text string of the static abstract. If the last text string is removed, then the next-to-last text string becomes the last text string, and the determination is repeated for that text string. In this manner, last text strings may be repetitively removed from the static abstract until it is determined that the last text string should not be removed, or until the static abstract contains a specified minimum number of text strings.

In block 306, the first set of text strings is combined with the second set of text strings. For example, a search engine may append the remainder of the "pared down" contextual abstract to the remainder of the "pared down" static abstract to produce a composite abstract. In one embodiment, the remainder of the contextual abstract is appended to the remainder of the static abstract with an ellipsis (" . . . ") inserted between the two.

In one embodiment, if a composite abstract is generated, then any part of a contextual abstract that is also contained in a static abstract is removed from either the contextual abstract or the static abstract for composition purposes. As a result, even if a contextual abstract overlaps a static abstract in a source, the overlapping part will not occur twice in the composite abstract.

Generating a Contextual Abstract

Figure 4:
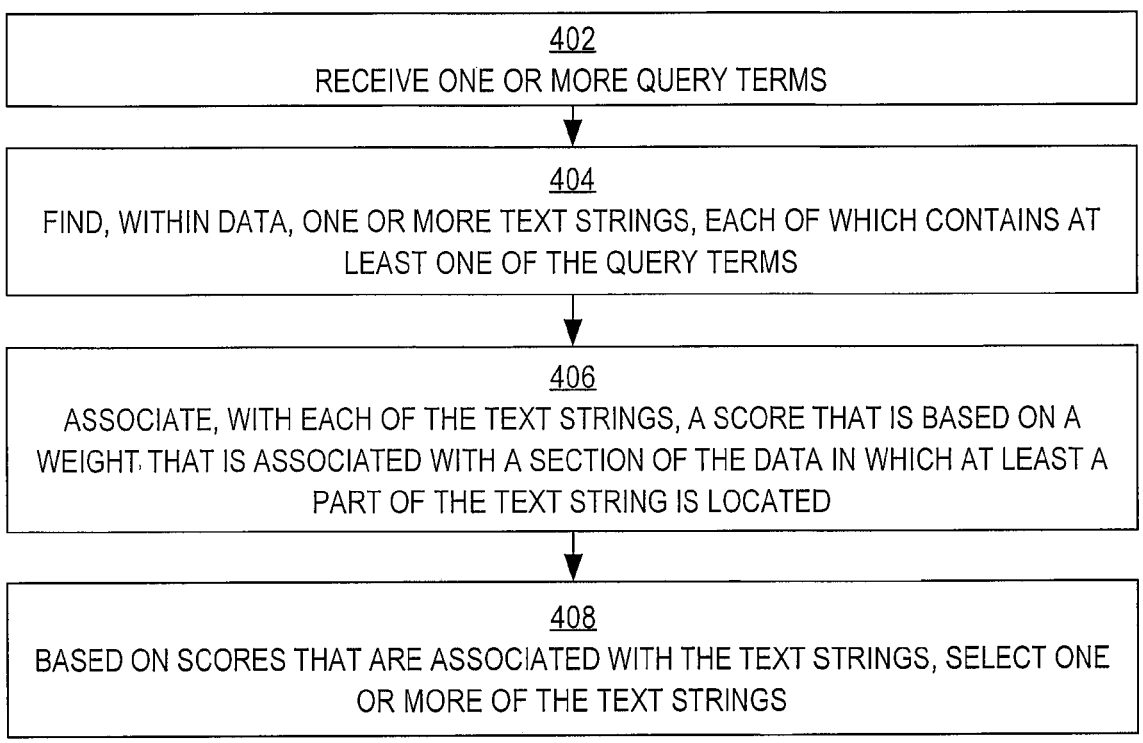
FIG. 4 is a flow diagram that illustrates a technique, according to an embodiment of the present invention, for generating a contextual abstract.

As is stated above, a contextual abstract for a page may be generated based on one or more query terms that are received as input from a user. FIG. 4 is a flow diagram that illustrates a technique, according to an embodiment of the present invention, for generating a contextual abstract. In block 402, one or more query terms are received. For example, a search engine may receive one or more query terms from a user.

In block 404, one or more text strings, each of which contains at least one of the query terms, are found within data. For example, a search engine may find, within a filtered and formatted derivative of a page called a "digest," one or more text strings, each of which contains at least one of the query terms. A technique for generating a digest is described below in the section entitled "GENERATING A DIGEST FOR A PAGE".

Each of the text strings may be called an "excerpt". In one embodiment, each excerpt (a) contains at least one query term, (b) does not contain fewer than M words, where M is a specified minimum word count, and (c) does not contain more than N words, where N is a specified maximum word count. In one embodiment, all of the excerpts that exist within the digest are found. An excerpt contains words that are contiguous within the digest. In another embodiment, only some of the excerpts that exist within the digest are found.

A query term that is submitted by a user may contain multiple words that are separated by characters that are not spaces, such as hyphens or periods. The same words may occur in the digest, but separated by spaces instead of the other character(s). Conversely, a user may submit multiple words, separated by spaces, as query terms. The same words may occur in the digest, but separated by characters that are not spaces. Words that are separated by certain specified characters may be referred to as "compound" words. In finding each text string that contains at least one query term, compound words should be considered. A technique for determining whether a compound query term matches multiple words in a digest, or whether multiple query terms match a compound word in a digest, is described below in the section entitled "MATCHING COMPOUND WORDS TO MULTIPLE WORDS".

In block 406, a score is associated with each of the text strings. A score that is associated with one text string may be different than a score that is associated with another text string. Each of the scores is based on a weight that is associated with a section of the data in which at least a part of the text string is located.

For example, if data (such as a digest of a page) consists of first, second, and third sections that are associated with a first, second, and third weight, respectively, and if a text string is completely contained within the third section, then the search engine may associate, with the text string, a score that is based on the third weight. If a text string is partially located in the first section and partially located in the second section, then a search engine may associate, with the text string, a score that is based on the greater of the first and second weights.

A score for a text string may be based on the number of words in the text string, the number of words in the text string that are query terms, and/or the number of distinct query terms that occur in the text string (not counting a particular query term more than once if it occurs within the text string more than once).

Additionally or alternatively, a score for a text string may be based on a number of sentences and/or sections in which the text string is at least partially contained. Because complete sentences or ideas are typically better abstract material than incomplete sentences or ideas, an text string that spans a large number of sections and/or sentences may be associated with a lower score than an text string that is contained within a small number of sections and/or sentences.

In one embodiment, a score for a text string may be based on a combination of some or all of the above factors and other factors. Thus, a particular score may be based upon a combination of factors.

In block 408, one or more of the text strings are selected based on scores that are associated with the text strings. For example, a search engine may select a specified number of the text strings that have the highest scores. The search engine may append the selected text strings together to form a contextual abstract for the page from which the digest was generated.

In one embodiment, text strings are selected one-at-a-time. In one embodiment, if, after a text string is selected, the number of currently selected text strings is less than a specified number then the remaining text strings are associated with new and potentially different scores that account for the text strings that have already been selected. In one embodiment, a score for a text string is based on the number of distinct query terms that occur in the text string but do not occur in any other text string that has already been selected. Therefore, when a text string is selected, scores for the remaining unselected text strings may change. The changed scores may be used in further text string selection. Repetitively scoring and selecting text strings in this manner promotes the likelihood that an abstract will contain at least one occurrence of each query term.

In one embodiment, each selected text string is extended to contain at least N words, where N is a specified number. In one embodiment, a text string is extended by alternately adding, to the left and right sides of the text string, words that occur on the corresponding left and right sides of the text string in the digest, until the text string has attained enough words to satisfy a minimum word count requirement. If, through extension, a text string becomes adjacent to another text string as those text strings occur in the digest, then the adjacent text strings are merged to form one text string.

Typically, in a digest, words that are separated from a text string by a section break or sentence break are not strongly related to query terms. Therefore, in one embodiment, a word from the left or right side is not added to the text string if a sentence break or section break occurs in the digest between the text string and the word, unless the text string is bounded on both sides by breaks. In other words, if, in the digest, the text string is bounded on only one side by a section break or sentence break, then words are added only to the opposite side of the text string until the opposite side also becomes bounded by a section break or sentence break. If both sides of a text string are bounded by a break and the text string contains less than the specified minimum number of words, then words are added to alternating sides of the text string just as if the breaks were not present.

In one embodiment, a selected text string is not extended, even if the selected text string contains fewer words than a specified minimum excerpt word count, if adding a word to the text string would cause a total number of words in all of the selected text strings to exceed a maximum abstract word count. By limiting a total number of words that may be contained in the combined selected text strings, a contextual abstract generator enables a user to quickly decide whether to investigate a resource that is associated with an abstract that contains the selected text strings.

In one embodiment, the selected—and in one embodiment, extended—text strings are appended together with ellipses inserted to separate each text string and indicate that the page contains text that is not contained in the abstract. In one embodiment, query terms in the text strings are emphasized. For example, query terms that occur in the appended text strings may be presented in a bold or otherwise highlighted font, thereby causing the query terms to be distinguished from the remainder of the appended text strings. The result of the technique described above is a contextual abstract.

Generating a Digest for a Page

A search engine may search an index of pages that have previously been discovered on the Internet by a computer program called a "crawler". Once a crawler has discovered a page, a digest may be automatically created for that page. The digest contains the text that is contained within the page. Other content that is contained within the page, such as image and script content, may be omitted from the digest. The digest is divided into sentences and sections by sentence break symbols and section break symbols, respectively.

Sentence break symbols are placed between sentences that are identified in the text of the page. Sentences may be identified by sentence-ending punctuation characters, such as the period, the question mark, and the exclamation point. In one embodiment, sentence break symbols are also placed where certain specified sentence delimiters, such as HTML anchor and image tags, are located in the HTML text of the page. In one embodiment, section break symbols are placed where certain specified section delimiters, such as HTML paragraph, table, and list tags, are located in the HTML text of the page. In one embodiment, HTML tags that are neither sentence delimiters nor section delimiters are replaced by white space in the digest.

Once a digest has been divided into sections, a weight is automatically associated with each section. Each section may be associated with a different weight. In one embodiment, the weight that is associated with a particular section is based on a percentage of characters within that section that are not contained within link text. Link text is text that, when represented by a page viewing application such as an Internet browser, acts as a selectable link to another page or resource or a different location within the page. HTML anchor text is one example of link text.

The greater the percentage of a section's characters that are not contained in link text, the higher the weight for that section will be. A section's weight is an indicator of how likely it is that the text within the section accurately represents the overall content of the page in which the text is contained. Link text typically does not accurately represent the overall content of the page in which it is contained.

Matching Compound Words to Multiple Words

As is stated above, words that are separated by certain specified characters may be referred to as "compound" words. In one embodiment, words that are separated only by a single quote (or apostrophe), a double quote, a forward slash, a backward slash, a colon, an ampersand, a plus sign, a hyphen, an underscore, an at sign, or a period are considered to be a single compound word. A character that separates the words in a compound word may be referred to as an "adjacency" character. Words that are separated by an adjacency character to form a compound word may be referred to as "components" of the compound word. For example, "Austria" and "Hungary" are both components of the compound word "Austria-Hungary".

In one embodiment, words that are separated only by a space, a left parenthesis, a right parenthesis, a left bracket, a right bracket, a left curly bracket, a right curly bracket, an exclamation point, a question mark, a semicolon, a percent sign, a carat, a tilde, an asterisk, a vertical bar ("|"), a pound sign, an equal sign, or a comma are considered to be separate words rather than a single compound word. A character separating such words may be referred to as a "space" character.

In one embodiment, a compound word that occurs in a query (a "compound query term") is treated differently than a compound word that occurs in a digest. Typically, a user who enters a compound query term is not interested in resources that contain separated components of the compound query term. Therefore, in one embodiment, a compound query term is treated the same as a single word when finding text strings in a digest. In other words, the compound query term is not considered to be found in the digest unless the digest contains the entire compound query term in the same form in which the user entered it.

In one embodiment, components of a compound word that occurs in a digest are treated as separate words when finding text strings in a digest. For example, if the compound word "Austria-Hungary" appears in the digest, and the query terms are "Austria" and "Hungary", then "Austria" and "Hungary" are considered to be separate query terms in the digest. However, in one embodiment, if the compound word consists of one or more components followed by an apostrophe followed by a single alphanumeric character, such as in the words "Chad's" and "can't", then the single alphanumeric character is not considered to be a separate query term in the digest.

In one embodiment, a query term is considered to be found in the digest if the query term is contained within a compound word in the digest, even if the compound word in the digest contains one or more components in addition to the query term.

Multiple query terms may be enclosed in quotes to form a phrase within the quotes (the phrase does not include the quotes themselves). In one embodiment, a phrase is considered to be found in the digest if the phrase is contained within a compound word in the digest, ignoring any adjacency characters that are contained in the compound word.

In one embodiment, when a compound word is added to a text string, due to being or containing a query term, or as a result of extending the text string to satisfy a minimum word count requirement, all of the components of the compound word are added to the text string. As a result, no contextual abstract will contain a part of a compound word without the remainder of the compound word.

Matching Words that Contain Special Characters

Some search engines may transform special characters that occur in query terms or page indices into non-special characters. A search engine may transform an accented character into a corresponding character in which the accent has been removed. In one embodiment, because the digest described above is used to locate query terms and display actual text that occurs in a page, accented or "special" characters in a digest are not transformed in this manner. A technique is described below to ensure that a query term that contains an unaccented character will be found in a digest in which the query term exists but contains the corresponding untransformed accented character.

Some query terms contain special characters, and other query terms do not. In one embodiment, if a user submits query terms that contain one or more special characters, then a digest is considered to contain a particular query term only if the digest contains the particular query term as it was submitted. In other words, if at least one special character occurs within query terms, then non-special characters in a digest are not considered to be the same as special characters in the query term.

In one embodiment, if user submits query terms that do not contain any special characters, then a digest is considered to contain a particular query term if the digest contains a word that would be the same as the particular query term if the special characters in the word were transformed into their corresponding non-special characters. In other words, if no special characters occur within query terms, then the special characters in a digest are considered to be the same as the corresponding non-special characters in the query terms.

Hardware Overview

Figure 5:
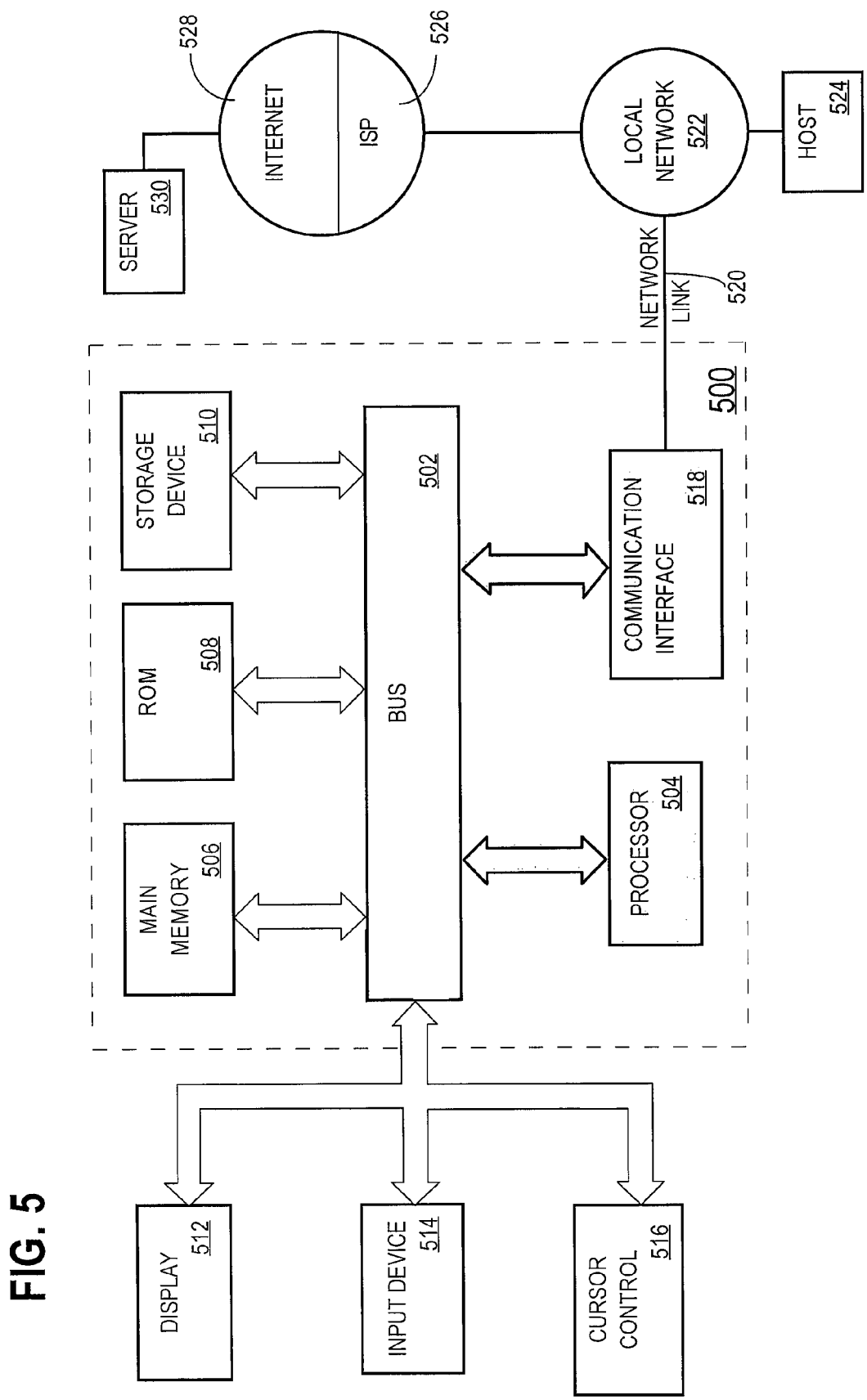
FIG. 5 is a block diagram that illustrates a computer system 500 upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 802 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

Processor 504 may execute the received code as it is received and/or stored in storage device 510, or other non-volatile storage, for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of generating a composite abstract for a document, the method comprising:
   receiving a query that includes one or more search query terms;
   generating a first version of a contextual abstract of the document, at least in part, by selecting, based on the one or more search query terms, first portions of the document for inclusion within the contextual abstract of the document;
   generating a static abstract of the document, at least in part, by selecting, without regard to the one or more search query terms, second portions of the document for inclusion within the static abstract of the document;
   generating a second version of the contextual abstract by removing one or more text strings from the first version of the contextual abstract;
   wherein removing the one or more text strings includes removing a particular text string from the first version of the contextual abstract based, at least in part, on similarities between the contextual abstract and the static abstract;
   combining text strings from the second version of the contextual abstract with text strings from the static abstract to form the composite abstract for the document;
   responding to the query with search results that include the composite abstract.

2. The method of claim 1, wherein the particular text string is a first particular text string, and further comprising:
   prior to combining text strings from the second version of the contextual abstract with text strings from the static abstract, removing the one or more text strings from the static abstract;
   wherein removing the one or more text string s from the static abstract includes removing a second particular text string from the static abstract based, at least in part, on similarities between the static abstract and the second version of the contextual abstract.

3. The method of claim 1, wherein similarity is based, at least in part, on a proportion of (a) words that are contained in both the particular text string and the static abstract of the document, relative to (b) words that are contained in the particular text string but not in the static abstract of the document.

4. The method of claim 1, wherein each text string in the contextual abstract satisfies specified criteria.

5. The method of claim 1, further comprising removing a part of the contextual abstract, wherein the part is contained in the static abstract.

6. The method of claim 2, further comprising removing the second particular text string from the static abstract if words from the second particular text string that occur in the static abstract comprise less than a specified percentage of words that are contained in the second particular text string.

7. An apparatus for generating a composite abstract for a document, the apparatus comprising:
   a processor;
   a module capable of receiving a query that includes one or more search query terms;
   a module capable of generating a first version of a contextual abstract of the document, at least in part, by selecting, based on the one or more search query terms, first portions of the document for inclusion within the contextual abstract of the document;
   a module capable of generating a static abstract of the document, at least in part, by selecting, without regard to the search query terms, second portions of the document for inclusion within the static abstract of the document;

a module capable of generating a second version of the contextual abstract by removing one or more text string from the first version of the contextual abstract;

wherein removing one or more text strings includes removing a particular text string from the first version of the contextual abstract based, at least in part, on similarities between the contextual abstract and the static abstract;

a module capable of combining text strings from the second version of the contextual abstract with text string from the static abstract to form the composite abstract for the document;

a module capable of responding to the query with search results that include the composite abstract.

8. The apparatus of claim 7, wherein the particular text string is a first particular text string, and further comprising:

prior to combining text strings from the second version of the contextual abstract with text strings from the static abstract, removing the one or more text strings from the static abstract;

wherein removing the one or more text strings from the static abstract includes removing a second particular text string from the static abstract based, at least in part, on similarities between the static abstract and the second version of the contextual abstract.

9. The apparatus of claim 8, further comprising a module capable of removing the second particular text string from the static abstract if words from the second particular text string that occur in the static abstract comprise less than a specified percentage of words that are contained in the second particular text string.

10. The apparatus of claim 7, wherein similarity is based, at least in part, on a proportion of (a) words that are contained in both the particular text string and the static abstract of the document, relative to (b) words that are contained in the particular text string but not in the static abstract of the document.

11. The apparatus of claim 7, wherein each text string in the contextual abstract satisfies specified criteria.

12. The apparatus of claim 7, further comprising a module capable of removing a part of the contextual abstract, wherein the part is contained in the static abstract.

13. One or more non-transitory computer-readable media storing instructions for performing a method of generating a composite abstract for a document, wherein method comprises:

receiving a query that includes one or more search query terms;

generating a first version of a contextual abstract of the document, at least in part, by selecting, based on the one or more search query terms, first portions of the document for inclusion within the contextual abstract of the document;

generating a static abstract of the document, at least in part, by selecting, without regard to the one or more search query terms, second portions of the document for inclusion within the static abstract of the document;

generating a second version of the contextual abstract by removing one or more text strings from the first version of the contextual abstract;

wherein removing the one or more text strings includes removing a particular text string from the first version of the contextual abstract based, at least in part, on similarities between the contextual abstract and the static abstract;

combining text strings from the second version of the contextual abstract with text strings from the static abstract to form the composite abstract for the document;

responding to the query with search results that include the composite abstract.

14. The one or more non-transitory computer-readable media of claim 13, wherein the particular text string is a first particular text string, and further comprising:

prior to combining text strings from the second version of the contextual abstract with text strings from the static abstract, removing the one or more text strings from the static abstract;

wherein removing the one or more text strings from the static abstract includes removing a second particular text string from the static abstract based, at least in part, on similarities between the static abstract and the second version of the contextual abstract.

15. The one or more non-transitory computer-readable media of claim 14, wherein the method further comprises removing the second particular text string from the static abstract if words from the second particular text string that occur in the static abstract comprise less than a specified percentage of words that are contained in the second particular text string.

16. The one or more non-transitory computer-readable media of claim 13, wherein similarity is based, at least in part, on a proportion of (a) words that are contained in both the particular text string and the static abstract of the document, relative to (b) words that are contained in the particular text string but not in the static abstract of the document.

17. The one or more non-transitory computer-readable media of claim 13, wherein each text string in the contextual abstract satisfies specified criteria.

18. The one or more non-transitory computer-readable media of claim 13, wherein the method further comprises removing a part of the contextual abstract, wherein the part is contained in the static abstract.

* * * * *

UNITED STATES PATENT AND TRADEMARK OFFICE
CERTIFICATE OF CORRECTION

PATENT NO. : 8,745,044 B2
APPLICATION NO. : 12/172165
DATED : June 3, 2014
INVENTOR(S) : Chad Carson et al.

It is certified that error appears in the above-identified patent and that said Letters Patent is hereby corrected as shown below:

In the Claims:

Column 16, line 35, in Claim 2: delete "string s", insert --strings--.

Signed and Sealed this
Twenty-sixth Day of May, 2015

Michelle K. Lee
*Director of the United States Patent and Trademark Office*